United States Patent
Kim et al.

(10) Patent No.: US 9,811,197 B2
(45) Date of Patent: Nov. 7, 2017

(54) DISPLAY APPARATUS AND CONTROLLING METHOD THEREOF

(71) Applicant: SAMSUNG ELECTRONICS CO., LTD., Suwon-si (KR)

(72) Inventors: Chang-han Kim, Suwon-si (KR); In-Ho Choi, Hwaseong-si (KR); Tae-hwa Hong, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 73 days.

(21) Appl. No.: 14/588,707

(22) Filed: Jan. 2, 2015

(65) Prior Publication Data

US 2015/0199066 A1 Jul. 16, 2015

(30) Foreign Application Priority Data

Jan. 16, 2014 (KR) .................. 10-2014-0005686

(51) Int. Cl.
*G06F 3/041* (2006.01)
*G06K 9/00* (2006.01)
*G06F 3/01* (2006.01)
*G06F 3/0488* (2013.01)

(52) U.S. Cl.
CPC ............ *G06F 3/0416* (2013.01); *G06F 3/013* (2013.01); *G06F 3/04886* (2013.01); *G06K 9/00597* (2013.01)

(58) Field of Classification Search
CPC ...... G06F 3/013; G06F 3/0421; G06F 3/0488; G06F 3/0616; G06F 3/0416
See application file for complete search history.

(56) References Cited

U.S. PATENT DOCUMENTS

| | | | |
|---|---|---|---|
| 9,223,401 B1* | 12/2015 | Raffle | G09G 3/003 |
| 2008/0036875 A1* | 2/2008 | Jones | H04N 5/23238 348/222.1 |
| 2013/0135196 A1 | 5/2013 | Park et al. | |
| 2014/0184550 A1* | 7/2014 | Hennessey | G06F 3/013 345/173 |
| 2014/0226131 A1* | 8/2014 | Lopez | G06F 1/1626 351/210 |

(Continued)

FOREIGN PATENT DOCUMENTS

KR 10-2013-0059768 A 6/2013

*Primary Examiner* — Ricardo L Osorio
(74) *Attorney, Agent, or Firm* — Sughrue Mion, PLLC

(57) ABSTRACT

A display apparatus is provided. The display apparatus includes: a display unit; a sensor configured to sense a touch input into the display unit; an eye direction sensor configured to sense an eye direction of a user; and a controller configured to divide a screen of the display unit into a plurality of areas, in response to an eye of the user being sensed toward a first area of the plurality of areas and a first touch input being sensed into the first area, perform a first control operation corresponding to the first touch input, and in response to a second touch input being sensed into the other areas except the first area, not perform a second control operation corresponding to the second touch input. Therefore, whether a function will be executed is determined according to an area in which an eye of a user is sensed and an area in which the eye of the user is not sensed. As a result, a malfunction of a display apparatus is prevented.

17 Claims, 16 Drawing Sheets

(56) References Cited

U.S. PATENT DOCUMENTS

| | | | | |
|---|---|---|---|---|
| 2014/0247232 A1* | 9/2014 | George-Svahn | .......... | G06F 3/02 345/173 |
| 2014/0256438 A1* | 9/2014 | Grant | ...................... | A63F 13/10 463/36 |
| 2014/0347363 A1* | 11/2014 | Kaburlasos | ............. | G06F 3/013 345/428 |
| 2016/0116980 A1* | 4/2016 | George-Svahn | ........ | G06F 3/013 345/168 |

* cited by examiner

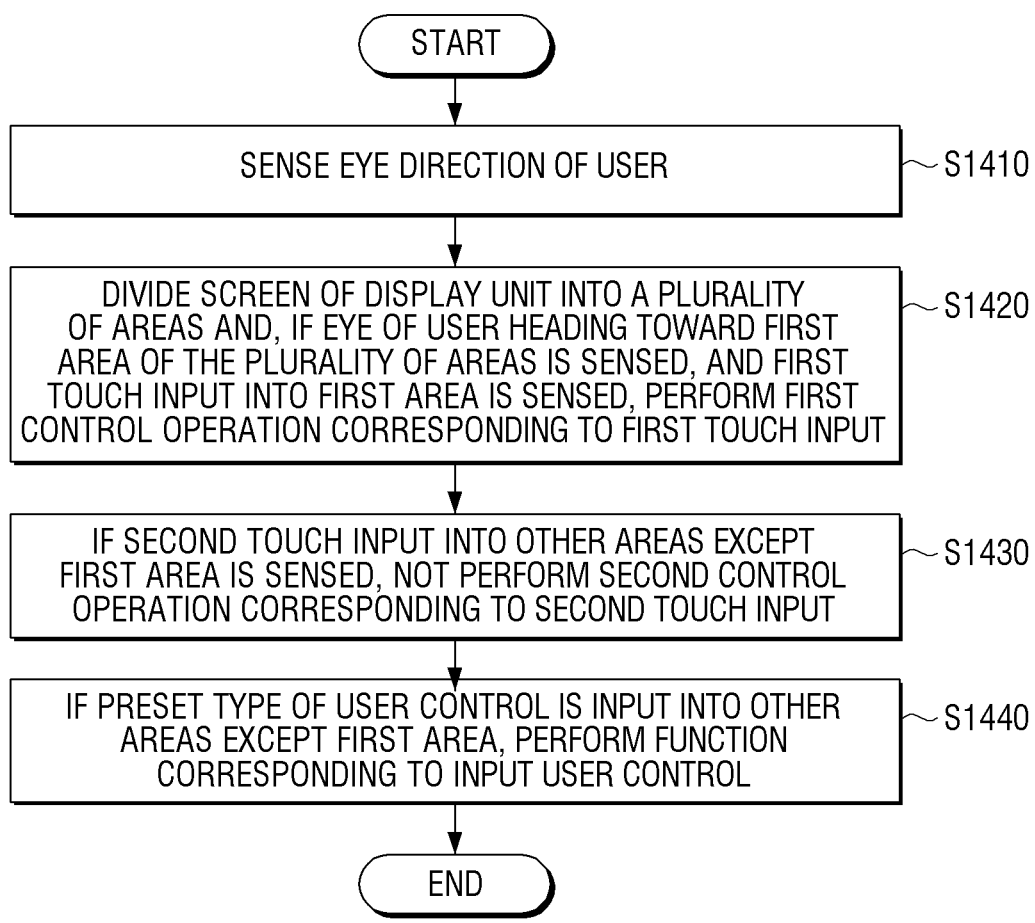

DISPLAY APPARATUS AND CONTROLLING METHOD THEREOF

CROSS-REFERENCE TO RELATED APPLICATION(S)

This application claims priority under 35 U.S.C. §119 from Korean Patent Application No. 10-2014-0005686, filed on Jan. 16, 2014, in the Korean Intellectual Property Office, the disclosure of which is incorporated herein by reference in its entirety.

BACKGROUND

1. Field

The present general inventive concept generally relates to providing a display apparatus and a controlling method thereof, and more particularly, to providing a display apparatus that executes a function through eye tracking and a controlling method.

2. Description of the Related Art

The development of electronic technologies has brought about the development and distribution of various types of electronic products. In particular, various types of display apparatuses, such as a TV, a portable phone, a personal computer (PC), a notebook PC, a personal digital assistant (PDA), etc., have been mainly used in most general homes.

An increase in using display apparatuses has increased the needs of users for more varied functions. For example, products having new functions have appeared one after another due to an increase in efforts of manufacturers to meet the needs of users.

Therefore, functions that are executed by a display apparatus have been diversified. In particular, methods of tracking the eyes of a user to determine an eye direction of the user, and executing a function according to the determination result have been developed.

However, there does not exist a method of executing a function according to an eye direction of a user determined by tracking the eyes of the user and a method of selectively executing a function with respect to a part of the display that a user does not look at in consideration of an eye direction of the user.

In particular, this function is required to develop an eye tracking technology and prevent a malfunction of a display apparatus.

SUMMARY

Exemplary embodiments address at least the above problems and/or disadvantages and other disadvantages not described above. Also, the exemplary embodiments are not required to overcome the disadvantages described above, and an exemplary embodiment may not overcome any of the problems described above.

The exemplary embodiments provide a display apparatus that executes a function according to an area in which an eye is sensed and an area in which the eye is not sensed, and a controlling method thereof.

According to an aspect of the exemplary embodiments, there is provided a display apparatus including: a display unit; a sensor configured to sense a touch input into the display unit; an eye direction sensor configured to sense an eye direction of a user; and a controller configured to divide a screen of the display unit into a plurality of areas, in response to an eye of the user being sensed toward a first area of the plurality of areas and a first touch input being sensed into the first area, perform a first control operation corresponding to the first touch input, and in response to a second touch input being sensed into the other areas except the first area, not perform a second control operation corresponding to the second touch input.

In response to a preset type of user control being input into the other areas, the controller may execute a function corresponding to the user control.

The user control may be a scroll control for scrolling the screen of the display unit. In response to the scroll control being input, the controller may scroll the whole screen of the display unit in a direction of the scroll control.

The user control may be a keyboard input control for controlling a virtual keyboard displayed on the display unit.

The display apparatus may further include a storage unit configured to store a plurality of user controls set to be input into the other areas, and corresponding function information respectively matching the user controls. In response to one of the plurality of user controls being input into the other areas, the controller may execute a control operation according to function information matching the input user control.

The display apparatus may further include: an imaging unit configured to perform image capturing with respect to a user to generate a captured image; and a storage unit configured to store eye images of a user respectively looking at the plurality of areas. The eye direction sensor may detect an image of an eye area of the user from the captured image and compare the detected image with an image stored in the storage unit to sense the eye direction of the user.

The display apparatus may further include: an infrared output unit configured to output infrared rays in a user direction; and an imaging unit configured to perform image capturing with respect to the user to generate a captured image. The eye direction sensor may detect a pupil, an iris, and a glint area generated by the infrared rays from the captured image and sense the eye direction of the user based on a position relation between the pupil, the iris, and the glint area.

The position relation may be set to different values according to positions of the plurality of areas toward which the eye of the user moves and then stored in the storage unit.

According to another aspect of the exemplary embodiments, there is provided a method of controlling a display apparatus. The method may include: sensing an eye direction of a user; dividing a screen into a plurality of areas and, in response to an eye of the user being sensed toward a first area of the plurality of areas and a first touch input being sensed into the first area, performing a first control operation corresponding to the first touch input; and in response to a second touch input being sensed into the other areas except the first area, performing a second control operation corresponding to the second touch input.

The method may further include: in response to a preset type of user control being input into the other areas, executing a function corresponding to the user control.

The user control may be a scroll control for scrolling the screen. In response to the scroll control being input, the whole screen may be scrolled in a direction of the scroll control.

The user control may be a keyboard input control for controlling a virtual keyboard displayed on the screen.

The method may further include: storing a plurality of user controls set to be input into the other areas and function information respectively matching the user controls; and in response to one of the plurality of user controls being input into the other areas, performing a control operation according to function information matching the input user control.

The method may further include: performing image capturing with respect to the user to generate a captured image. An image of an eye area of the user may be detected from the captured image and then compared with eye images that respectively look at the plurality of areas and are stored in a storage unit, to sense the eye direction of the user.

The method may further include: outputting infrared rays in a user direction; and performing capturing with respect to the user to generate a captured image. A pupil, an iris, and a glint area generated by the infrared rays may be detected from the captured image, and the eye direction of the user may be sensed based on a position relation between the pupil, the iris, and the glint area.

The position relation may be set to different values according to positions of the plurality of areas toward which the eye of the user heads and then stored.

BRIEF DESCRIPTION OF THE DRAWINGS

The above and/or other aspects will be more apparent by describing certain exemplary embodiments with reference to the accompanying drawings, in which:

FIG. 14 is a flowchart of a method of controlling a display apparatus including a display unit and a sensor for sensing a touch input into the display unit, according to another exemplary embodiment of the present general inventive concept.

DETAILED DESCRIPTION OF THE EXEMPLARY EMBODIMENTS

Figure 1:
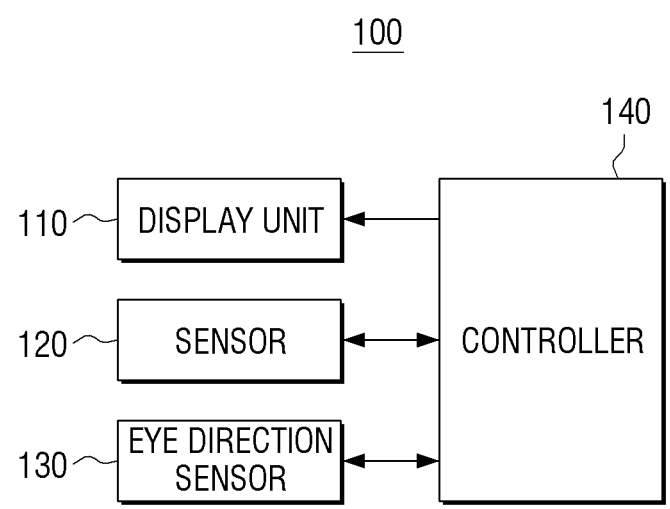
FIG. 1 is a block diagram illustrating a structure of a display apparatus according to an exemplary embodiment of the present general inventive concept.

Exemplary embodiments are described in greater detail with reference to the accompanying drawings.

In the following description, the same drawing reference numerals are used for the same elements even in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, well-known functions or constructions are not described in detail since they would obscure the exemplary embodiments with unnecessary detail.

FIG. 1 is a block diagram illustrating a structure of a display apparatus 100, according to an exemplary embodiment.

Referring to FIG. 1, the display apparatus 100 includes a display unit 110, i.e., display, a sensor 120, an eye direction sensor 130, and a controller 140. Here, the display apparatus 100 may be realized as various types of electronic devices such as a TV, an electronic bulletin board, an electronic table, a large format display (LFD), a smartphone, a tablet PC, a desktop PC, a notebook PC, etc.

The display 110 may display a screen. In detail, the display 110 may include a display panel (not shown) and a backlight (not shown). Here, the display panel may include a plurality of sub pixels, and the backlight may include a light source for irradiating backlight, i.e., light, onto the display panel.

The sensor 120 may sense a touch input into the display 110. Here, the sensor 120 may mainly include a touch panel or a touch screen. The touch panel is a transparent switch panel that is combined with a cathode-ray tube (CRT) or a liquid crystal display (LCD) and that has an area displaying a sentence, a picture, etc. and being directly pressed so as to control the display apparatus. The transparent switch panel may be configured as an optical type switch that uses infrared light, a transparent electrode type that uses a contact point of a transparent conductive layer in which an indium tin oxide (ITO) film is coated on a polyester film, a transparent conductive film type in which a stainless steel is buried, a capacitive type that detects variations in a capacitance, or a type that senses a position of a pressure of a fingertip touching a panel from a distribution of a force on a pressure sensor disposed around the panel, etc.

The touch screen refers to a screen that directly receives input data to check a position of a human hand or an object touching a character displayed on a screen, or a particular position and perform particular processing with respect to the checked position by using stored software. Also, a touch panel is installed on a screen of a general monitor to show a function of the touch screen. Therefore, if a hand touches a character or a picture pre-displayed on the screen including the touch panel, an option selected by a user is checked according to a position of the screen that the hand touches, and a command corresponding to the option is processed by a computer so as to easily acquire the desired information.

Therefore, the sensor 120 may sense the touch input that is input through the touch panel or the touch screen.

The eye direction sensor 130 may sense an eye direction of the user. A method of sensing the eye direction of the user will be described in detail later.

The controller 140 may divide the screen of the display 110 into a plurality of areas, if an eye of the user heading toward a first area of the plurality of areas is sensed, and a first touch input into the first area is sensed, may perform a first control operation corresponding to the first touch input, and if a second touch input into the other areas except the first area is sensed, may not perform a second control operation corresponding to the second touch input.

In detail, the controller 140 may activate an area of the touch pad or the touch screen corresponding to a part that the user looks at, to sense a touch input. However, the controller 140 may deactivate an area of the touch pad or the touch screen corresponding to a part that the user does not look at, so as not to sense a user's touch input.

Alternatively, the controller 140 may activate the touch pad or the touch screen regardless of the part that the user looks at and the part that the user does not look at. In other words, if a touch input into the area corresponding to the part that the user looks at is sensed, the controller 140 may perform a control operation corresponding to the touch input. However, although a touch input into the area corresponding to the part that the user does not look at is sensed, the controller 140 may not perform a control operation corresponding to the touch input. In other words, the controller 140 may instruct software not to perform a control operation corresponding to the touch input into the area corresponding to the part that the user does not look at.

Figure 2:
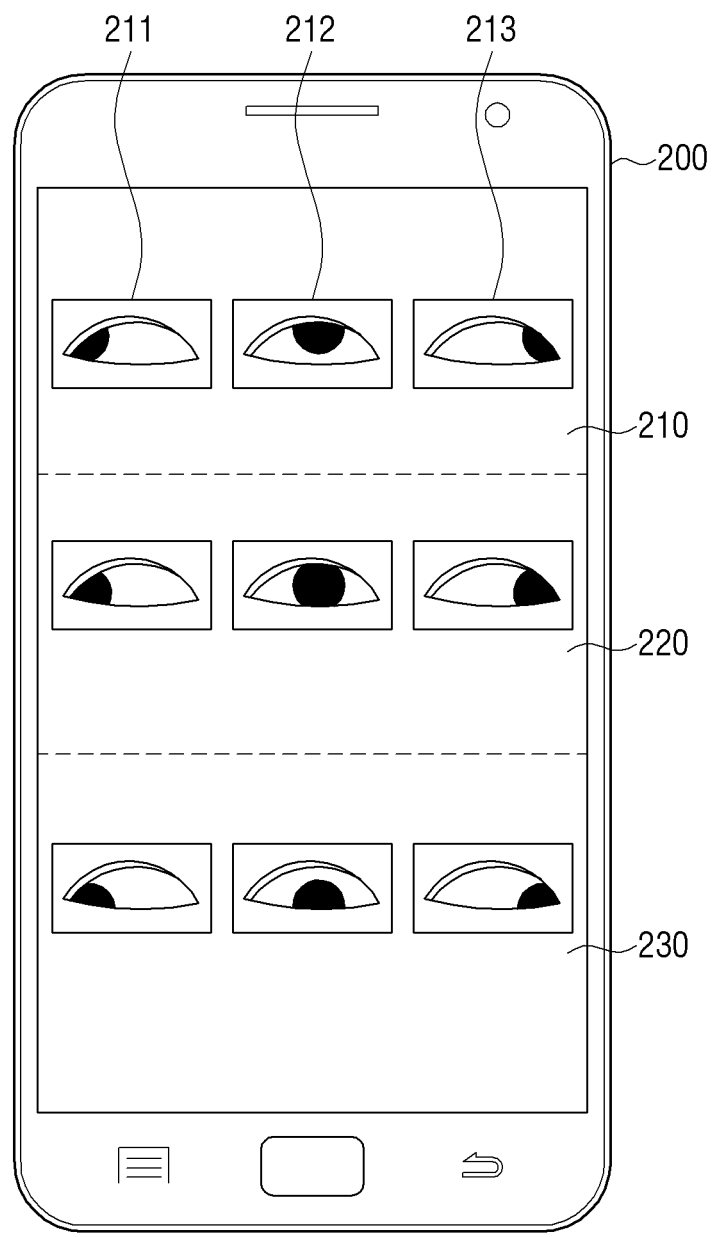
FIG. 2 is a detailed view illustrating a screen of a display apparatus, according to an exemplary embodiment of the present general inventive concept.

FIG. 2 is a detailed view illustrating a screen of a display apparatus 200, according to an exemplary embodiment.

Referring to FIG. 2, the screen of the display apparatus 200 is divided into three areas 210, 220, and 230. Here, the screen of the display apparatus 200 is not physically divided into the three areas 210 220, and 230. However, the screen of the display apparatus 200 is divided to sense an eye of the user in order to enable the controller 140 to determine the eye of the user.

In detail, the controller 140 may sense an eye of the user moving toward the first area 210 of the three areas 210, 220, and 230. Here, the controller 140 may determine an eye direction of the user based on data about eye images heading toward respective areas such as eye images 211, 212, and 213 appearing in the first area 210.

In other words, if an eye image, in which a pupil leans to the top right corner of an eye like the eye image 213 appearing in the rightmost part of the first area 210, is input through an imaging unit (not shown) of the display apparatus 200, the eye direction sensor 130 may sense that the eye of the user moves toward an upper area.

If an eye image, in which the pupil is positioned on the top center of the eye, like the eye image 212 appearing in a center of the first area 210, is input through the imaging unit, i.e., imager, of the display apparatus 200, the eye direction sensor 130 may sense that the eye of the user moves toward an upper area of a center of the screen.

Also, if an eye image, in which the pupil leans to a top left corner of the eye like the eye image 211 appearing in the leftmost part of the first area 211, is input through the imager of the display apparatus 200, the eye direction sensor 130 may sense that the eye of the user moves toward a left upper area of the screen.

Similarly, the controller 140 may determine which direction the pupil leans toward, among left, center, and right directions, and upper and lower directions, to sense eye directions of eye images appearing in the second and third areas 220 and 230.

Therefore, the controller 140 may determine which area the eye direction of the user is sensed from, based on data from eye images moving toward the areas 210, 220, and 230.

The screen of the display apparatus 200 is divided into three areas in FIG. 2 but is not limited thereto.

Also, if a touch input is sensed in the first area 210 in which the eye of the user is sensed i, the controller 140 may perform a control operation corresponding to the touch input. Here, the sensed touch input into the first area 210 may include all types of touch inputs for executing functions. For example, the sensed touch input may include a one tap touch, a double touch, a drag-and-drop, a long touch, a plurality of touch inputs that are simultaneously input, etc.

Although a touch input is sensed in the second and third areas 220 and 230 in which the eye of the user is not sensed, the controller 140 may not perform a control operation corresponding to the touch input.

Figure 3:
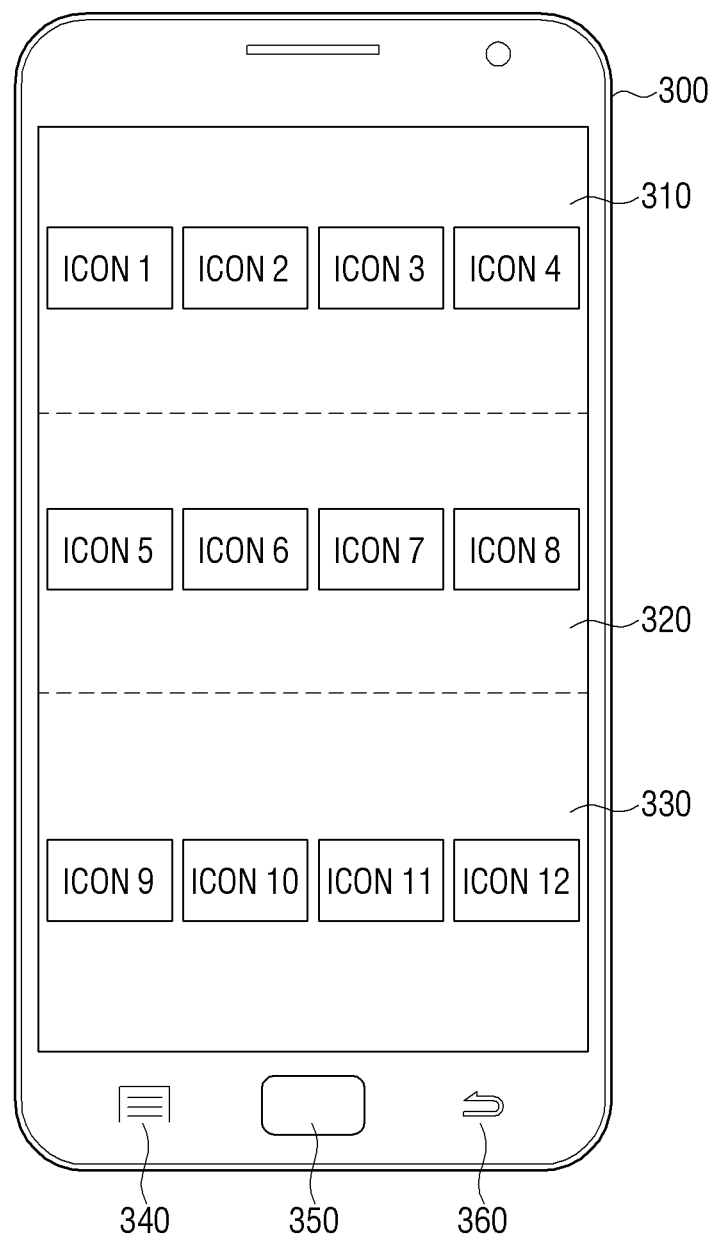
FIG. 3 is a view illustrating a screen of a smartphone, according to an exemplary embodiment of the present general inventive concept.

FIG. 3 is a view illustrating a screen of a smartphone 300, according to an exemplary embodiment. Referring to FIG. 3, the screen of the smartphone 300 displays a plurality of icons, and the controller 140 of the smartphone 300 may divide the screen into three areas 310, 320, and 330 to sense an eye direction of a user.

For example, if the controller 140 senses an eye of the user pointed toward area 310 positioned in the uppermost part among the three areas 310, 320, and 330, and a touch input is sensed in at least one from among icons 1 through 4 displayed in the area 310, in which the eye of the user is sensed, the controller 140 may perform a control operation corresponding to the touch input. For example, if a touch input such as tapping the icon 2 is sensed, the controller 140 may execute a software program corresponding to the icon 2.

Also, if the controller 140 senses the eye of the user in the area 320 positioned in the center among the three areas 310, 320, and 330, and a touch input is sensed in at least one from among icons 5 through 8 displayed in the area 320, in which the eye of the user is sensed, the controller 140 may perform a control operation corresponding to the touch input. In other words, if a touch input such as tapping the icon 6 is sensed, the controller 140 may execute software corresponding to the icon 6. For example, if the icon 6 is an icon about a message, the controller 140 may display a window that displays the message.

The above-described example may be applied equally to the area 330 positioned in the lowermost part among the three areas 310, 320, and 330.

Icons are displayed on the screen in FIG. 3, but a website screen may also be displayed on the screen. In other words, if a website screen is displayed on the whole screen, an eye of the user is sensed in the area 310 positioned in the uppermost part among the three areas 310, 320, and 330, and a touch input into the website screen corresponding to the area 310 is sensed, the controller 140 may execute a function corresponding to the touch input into the website screen corresponding to the area 310. However, although a touch input is sensed in a website corresponding to the areas 320 and 330 in which the eye of the user is not sensed, the controller 140 may not execute functions corresponding to the touch inputs. For example, although a touch input for enlarging a screen or touching and downloading a displayed image is sensed on the website screen corresponding to the areas 320 and 330 in which the eye of the user is not sensed, the controller 140 may not execute a function of enlarging the screen or downloading the image, wherein the function corresponds to the touch input.

A touch input into a screen displayed on the display apparatus 300 has been described in FIG. 3. However, the controller 140 may apply the above-described contents equally to physical keys 340, 350, and 360 installed on the display apparatus 300.

For example, although an eye of the user is sensed on a screen of one of the three areas 310, 320, and 330, and touch inputs into the physical keys 340, 350, and 360 are sensed, the controller 140 may not execute functions corresponding to the touch inputs. Here, the physical keys 340, 350, and 360 refer to keys that are directly realized as a button, a sensor for sensing touch inputs, etc. not as icons or virtual keyboards displayed on a displayed screen, on the display apparatus 300.

Therefore, although the user looks at the screen of the display apparatus 300 to control the physical keys 340, 350, and 360, the controller 140 may not execute functions corresponding to the physical keys 340, 350, and 360 to prevent a malfunction of the display apparatus 300.

If a preset type of user control is input into the other areas except a first area in which an eye of the user is sensed, the controller 140 may execute a function corresponding to the user control.

Figure 4:
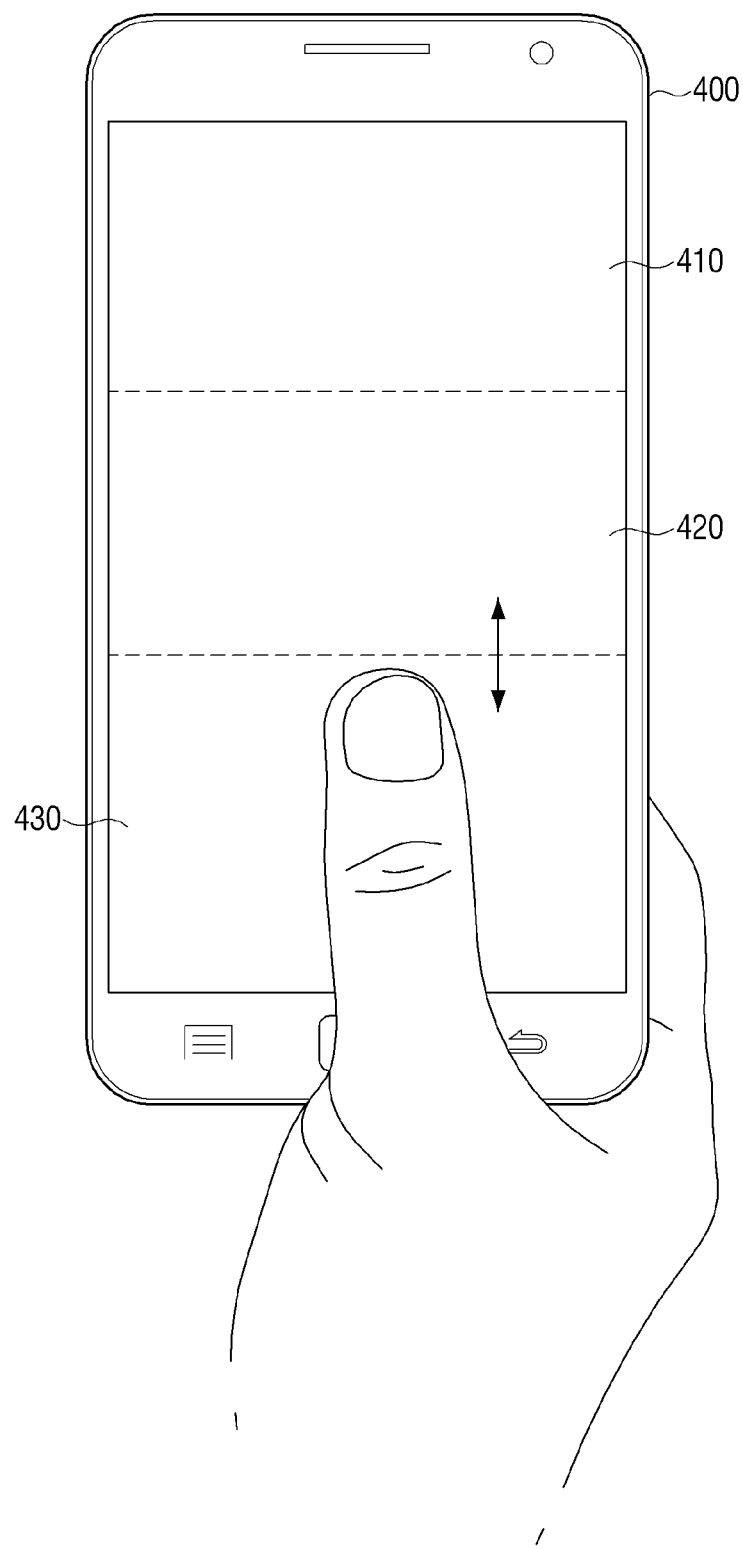
FIG. 4 is a view illustrating a process of executing a function corresponding to a user control, according to an exemplary embodiment of the present general inventive concept.

FIG. 4 is a view illustrating a process of executing a function corresponding to a user control, according to an exemplary embodiment of the present general inventive concept.

Referring to FIG. 4, if an eye of a user is sensed in an area 410 positioned in an uppermost part among three areas 410, 420, and 430 of a displayed screen, and a preset type of user control is input into the other areas 420 and 430 except the area 410, the controller 140 of a display apparatus 400 may execute a function corresponding to the user control.

Here, the preset type of user control may be a scroll control performed on a screen of a display unit. In other words, a one tap touch, a double touch, a long touch, a one tap touch during scrolling, etc., correspond to examples of a touch of the user on the screen with looking at the screen, and the scroll control corresponds to a touch of the user on the screen without looking at the screen.

In other words, the controller 140 may sense scroll controls performed in all areas of the screen regardless of a preset area of the screen that the user looks at, and execute functions corresponding to the scroll controls.

In detail, although the eye of the user is sensed in the area 410 positioned in the uppermost part, and a scroll control is input into the areas 420 and 430 in which the eye of the user is not sensed, the controller 140 may scroll a whole screen of the display unit in a direction of the scroll control.

Also, although the eye of the user is sensed in the area 410 positioned in the uppermost part, and a one tap touch, a double touch, a long touch, a one tap touch during scrolling, etc., which are performed by the user while looking at the screen, are input into the areas 420 and 430 in which the eye of the user is not sensed, the controller 140 may not perform control operations corresponding to the input touches.

Figure 5:
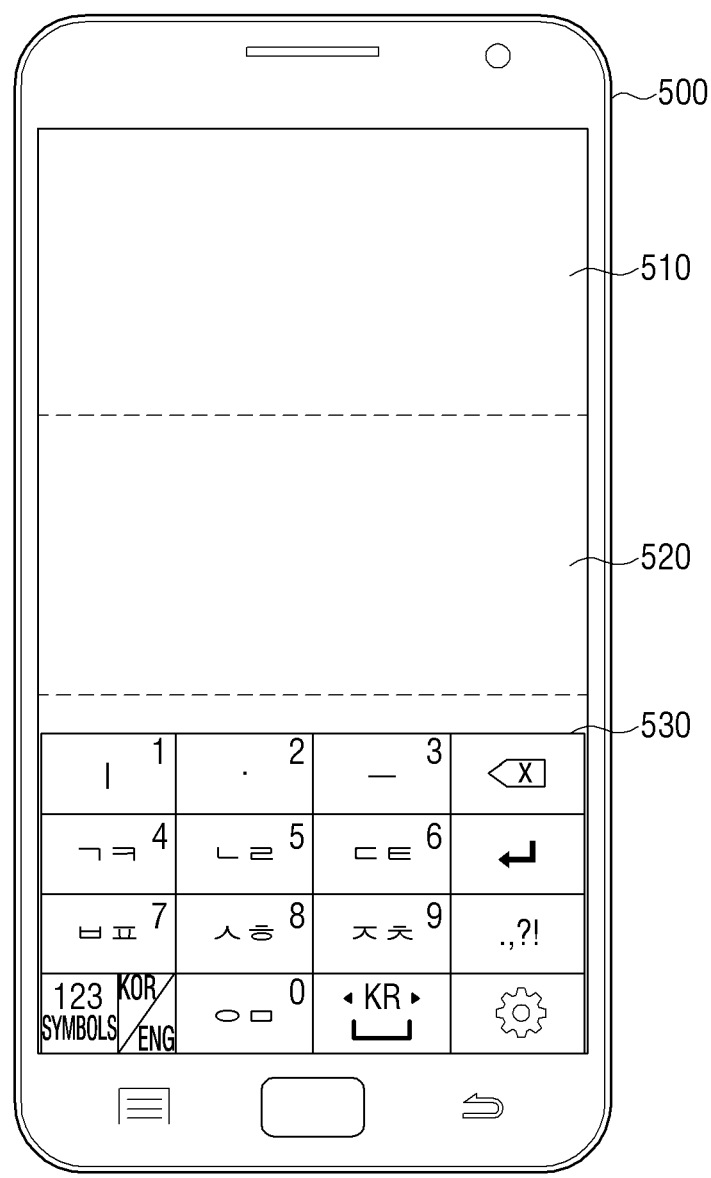
FIG. 5 is a view illustrating a process of executing a function corresponding to a user control, according to another exemplary embodiment of the present general inventive concept.

FIG. 5 is a view illustrating a process of executing a function corresponding to a user control, according to another exemplary embodiment of the present general inventive concept.

Referring to FIG. 5, a virtual keyboard is displayed in an area 530 positioned in a lowermost part among three areas 510, 520, and 530 of a screen displayed on a display apparatus 500.

If an eye of a user is sensed in the area 510 positioned in an uppermost part, and a keyboard input control is sensed for controlling the virtual keyboard displayed in the area 530 in which the eye of the user is not sensed, the controller 140 may perform a control operation corresponding to the keyboard input control.

As described above, a touch input for controlling the virtual keyboard may be input regardless of which area of the screen the user looks at.

Although the eye of the user is sensed in the area 510 positioned in the uppermost part, and a one tap touch, a double touch, a long touch, a one tap touch during scrolling, etc., which are performed by the user while looking at the screen, are input into the areas 520 and 530 in which the eye of the user is not sensed, the controller 140 may not perform control operations corresponding to the input touches.

If a user control is input into an area in which an eye of the user is not sensed as described above, the user may set whether the controller 140 will perform a control operation corresponding to the user control.

Figure 6:
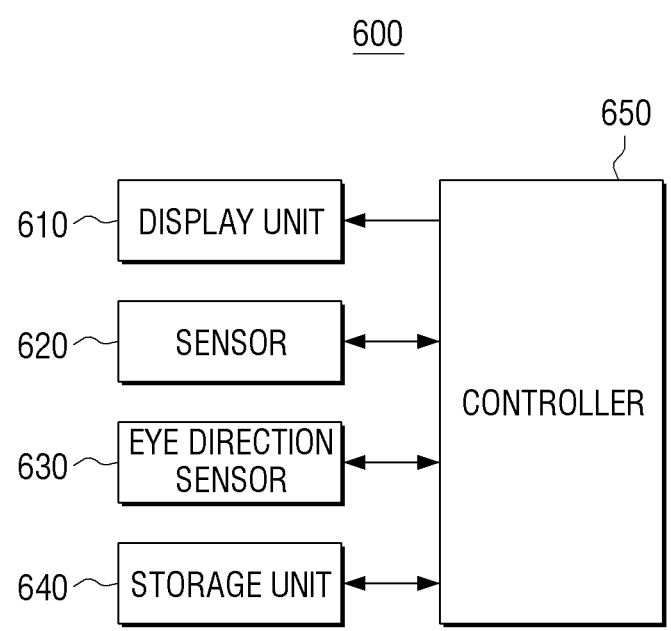
FIG. 6 is a block diagram illustrating a detailed structure of a display apparatus, according to another exemplary embodiment of the present general inventive concept.

FIG. 6 is a block diagram illustrating a detailed structure of a display apparatus 600, according to another exemplary embodiment of the present general inventive concept.

Referring to FIG. 6, the display apparatus 600 includes a display 610, i.e., display, a sensor 620, an eye direction sensor 630, a storage unit 640, i.e., storage, and a controller 650. Here, the display unit 610, the sensor 620, and the eye direction sensor 630 respectively correspond to the display 110, the sensor 120, and the eye direction sensor 130 of the display apparatus 100 of FIG. 1 described above, and thus their detailed descriptions are omitted herein.

The storage 640 may store a plurality of user controls that are set to perform inputs into other areas except an area in which an eye of a user is sensed, and corresponding function information respectively matching the user controls.

For example, the storage 640 may store information about a scroll control, a keyboard input control, a function of scrolling a whole screen matching the keyboard input control in a direction of the scroll control, and a function input according to a virtual keyboard control.

If one of the plurality of user controls stored in the storage unit 640 is input into the other areas except the area in which the eye of the user is sensed, the controller 650 may perform a control operation according to function information matching the input user control.

In other words, if a scroll control of the plurality of user controls stored in the storage 640 is input into the other areas except the area in which the eye of the user is sensed, the controller 650 may scroll a whole screen in a direction of the scroll control according to a function matching the input scroll control.

Figure 7:
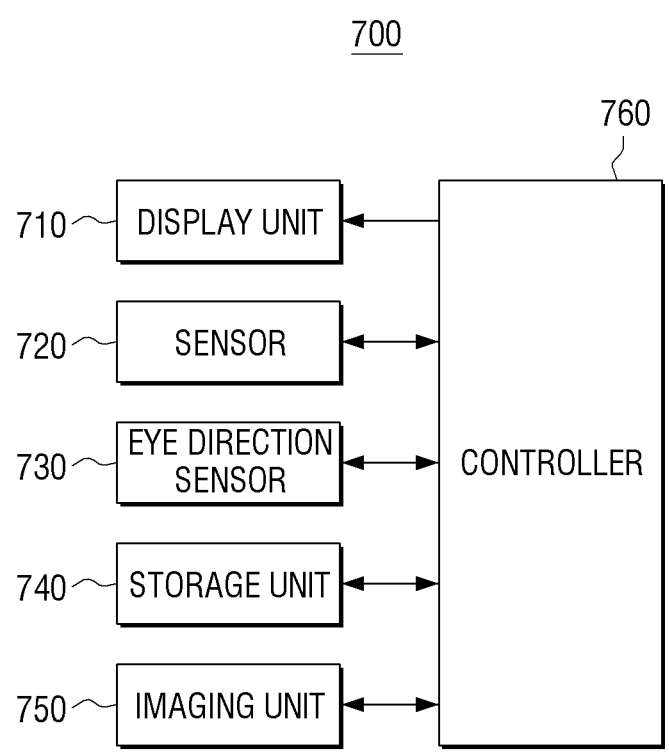
FIG. 7 is a block diagram illustrating a detailed structure of a display apparatus for sensing an eye of a user, according to another exemplary embodiment of the present general inventive concept.

FIG. 7 is a block diagram illustrating a detailed structure of a display apparatus 700 for sensing an eye of a user, according to another exemplary embodiment of the present general inventive concept.

Referring to FIG. 7, the display apparatus 700 includes a display unit 710, i.e., display, a sensor 720, an eye direction sensor 730, a storage unit 740, i.e., storage, an imaging unit 750, i.e., imager, and a controller 760. Here, the display 710, the sensor 720, and the controller 760 respectively correspond to the display 110, the sensor 120, and the controller 140 of FIG. 1 described above, and thus their detailed descriptions are omitted herein.

The imager 750 may perform image capturing with respect to a user to generate a captured image. In general, the imager 750 may be realized as a charge-coupled device (CCD). The CCD is a photo sensor semiconductor that converts light into an electric signal in a digital camera and performs a function of exposing a film to light in a general camera.

A process of generating the captured image by the imager 750 will now be described in more detail. Light that is transmitted into the display apparatus 700 through a lens and an aperture is converted into an electric signal according to an intensity of the light adjusted by the CCD. The electric signal is converted into an image file through a converting device referred to as an analog-to-digital-converter (ADC) and then stored in a memory. Here, the ADC converts an analog signal into a digital signal of 0 and 1. Here, if a driving signal for driving the imager 750 is input, the light is incident onto the CCD through the lens and the aperture, and thus an intensity of the light incident from the lens is recorded in the CCD. Here, light of the captured image is divided into different colors by a RGB color filter attached to the CCD. The different colors are converted into an electric signal by hundreds of thousands of phototransistors constituting the CCD. Here, the imaging unit 750 generates the captured image by using the electric signal converted by the CCD. The imager 750 may be used in all types of electronic devices such as a camera, a smartphone, a notebook PC, a TV, etc.

The storage 740 may store eye images that respectively look at a plurality of areas. In detail, the storage 740 may store data about various images of eyes that respectively look at areas of the display 710.

The eye direction sensor 730 may detect an image of an eye area of the user from the captured image and compare the detected image with an image stored in the storage 740 to sense an eye direction of the user. In detail, the eye direction sensor 730 may sense the eye direction of the user through pattern learning about eye images respectively looking at a plurality of areas based on the detected image.

For example, the eye direction sensor 730 may compare data about various images of an eye looking at the uppermost area 510 of FIG. 5 with data about the detected image to determine whether the data about the various images is equal to the data about the detected image. If it is determined that the data about the various images is equal to the data about the detected image, the eye direction sensor 730 may determine that the eye direction of the user is in the uppermost area 510.

The eye direction sensor 730 may compare data about various images of an eye looking at the rightmost area of the uppermost area 510 of FIG. 5 with the data about the detected image to determine whether the data about the various images is equal to the data about the detected image. If it is determined that the data about the various images is equal to the data about the detected image, the eye direction sensor 730 may determine that the eye direction of the user is in the rightmost area of the uppermost area 510.

Figure 8:
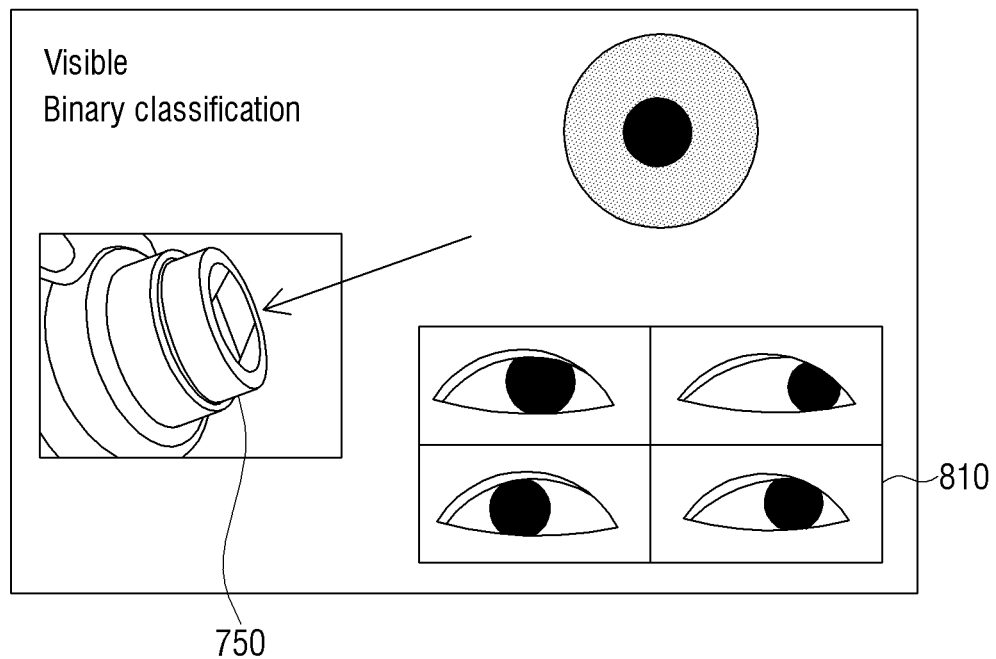
FIG. 8 is a view illustrating a method of determining an eye of a user through pattern learning, according to an exemplary embodiment of the present general inventive concept.

FIG. 8 is a view illustrating a method of determining an eye direction of a user through pattern learning, according to an exemplary embodiment.

In other words, as described above, the imager 750 may perform image capturing with respect to a user to generate a captured image. The eye direction sensor 730 may detect an image of an eye area of the user from the captured image and compare the detected image with various eye images 810 stored in the storage unit 740 to determine an eye direction of the user.

Figure 9:
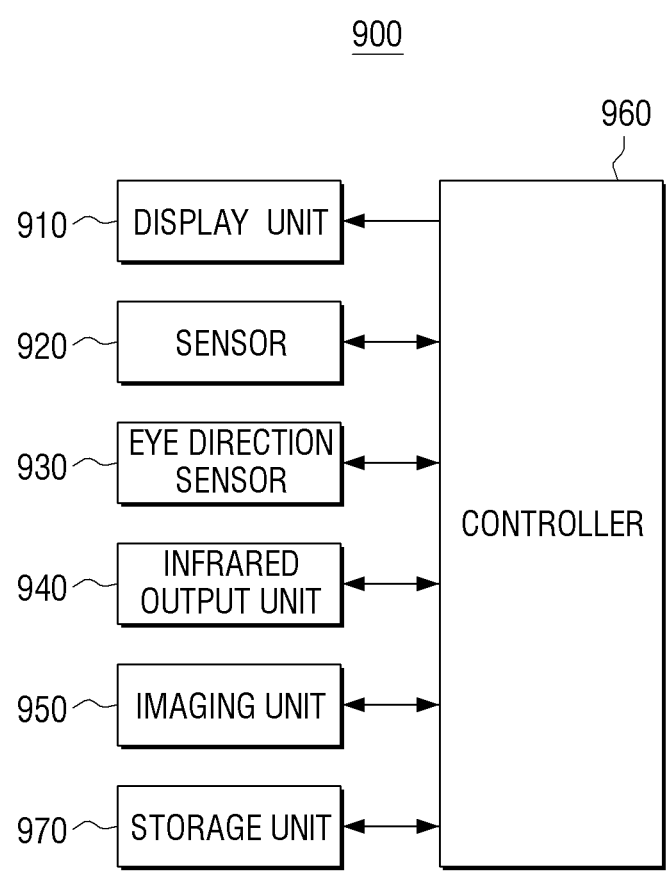
FIG. 9 is a block diagram illustrating a detailed structure of a display apparatus for sensing an eye of a user, according to another exemplary embodiment of the present general inventive concept.

FIG. 9 is a block diagram illustrating a detailed structure of a display apparatus 900 for sensing an eye direction of a user, according to another exemplary embodiment of the present general inventive concept.

Referring to FIG. 9, the display apparatus 900 includes a display unit 910, i.e., display, a sensor 920, an eye direction sensor 930, an infrared output unit 940, i.e., infrared output, an imaging unit 950, i.e., imager, a controller 960, and a storage unit 970, i.e., storage. Here, the display 910, the sensor 920, the controller 960, and the storage 970 respectively correspond to the display 710, the sensor 720, the controller 760, and the storage unit 740 of FIG. 7 described above, and thus their descriptions are omitted herein.

The infrared output unit 940 outputs infrared rays in a user direction. Infrared light may be mainly used as the infrared output 940 and refers to a device that senses information from infrared rays emitted by a given object. There are a quantum type and a thermal type as methods of sensing information of infrared rays. The quantum type senses light as a quantum by using effects of photoconductivity and a photoelectron-motive force and is formed of indium antimonide (InSb), mercury-cadmium telluride (HgCdTe), or the like. The quantum type has a high sensitivity or response speed, is kept at a low temperature to reduce thermal noise, and has a selectivity with respect to a wavelength.

The thermal type converts absorbed infrared rays into heat to use variations in a physical quantity of a material caused by a temperature change. There are many types according to detection principles, but there are a thermistor type using variations in an electric resistance and a pyroelectric type using variations in a charge quantity as actually used types. This type of sensor may be equally sensitive to all wavelengths, may be nonselective, and may be used around a room temperature.

The infrared output 940 may output the infrared rays in the user direction by using the infrared light, in more detail, may output the infrared rays in an eye direction of the user. In other words, the infrared light may be disposed around a camera lens to enable the infrared output 940 to output the infrared rays in the eye direction of the user.

The display apparatus 900 according to the present exemplary embodiment uses a method of outputting infrared rays in a user direction as described above but may use a method of outputting infrared rays, ambient light, or light.

The imager 950 may perform capturing with respect to the user to generate a captured image.

The eye direction sensor 930 may detect a pupil, an iris, and a glint area generated by infrared rays from the captured image. In general, in a visible light environment, brightness distributions of an iris and a pupil are similar to each other, and thus a boundary between the iris and the pupil does not well appear. However, in infrared light and black-and-white camera environments, there is a large difference in brightness and contrast between the iris and the pupil, and thus the boundary between the iris and the pupil is distinct.

The eye direction sensor 930 may detect a boundary between the pupil and the iris, and a boundary between the iris and a white of an eye from the captured image in order to detect the pupil and the iris from the generated captured image.

In detail, the detection of the boundary between the pupil and the iris may be performed through a circular edge detector. In other words, gray level values of pixels are added along a circumference of a circle formed by a center and a radius with changing the center and the radius to determine a position having a maximum difference value as the boundary between the pupil and the iris according to variations in the radius.

The boundary between the iris and the white of the eye is thick and blurry and thus is relatively difficult to be detected. Therefore, a center of the iris may be detected based on a center of the pupil, and a radius of the iris may be detected based on that the radius of the iris is almost constant in a fixed-focus camera.

There are the above-described example and various existing technologies as methods of detecting a pupil and an iris. Also, the above-described example and the various existing technologies may be used to detect the pupil and the iris through the eye direction sensor 930 of the display apparatus 900 according to the present exemplary embodiment.

The eye direction sensor 930 may detect the glint area generated by the infrared rays. Here, the glint area generated by the infrared rays indicates that the infrared rays output from the infrared output 940 in the user direction are glints reflected by a cornea of the eye of the user.

The eye direction sensor 930 may use a method of receiving the glint area generated by the infrared rays by using an infrared filter to detect the glint area generated by the infrared rays or may detect the glint area from a captured image in which the glint area generated by the infrared rays are displayed.

Figure 10:
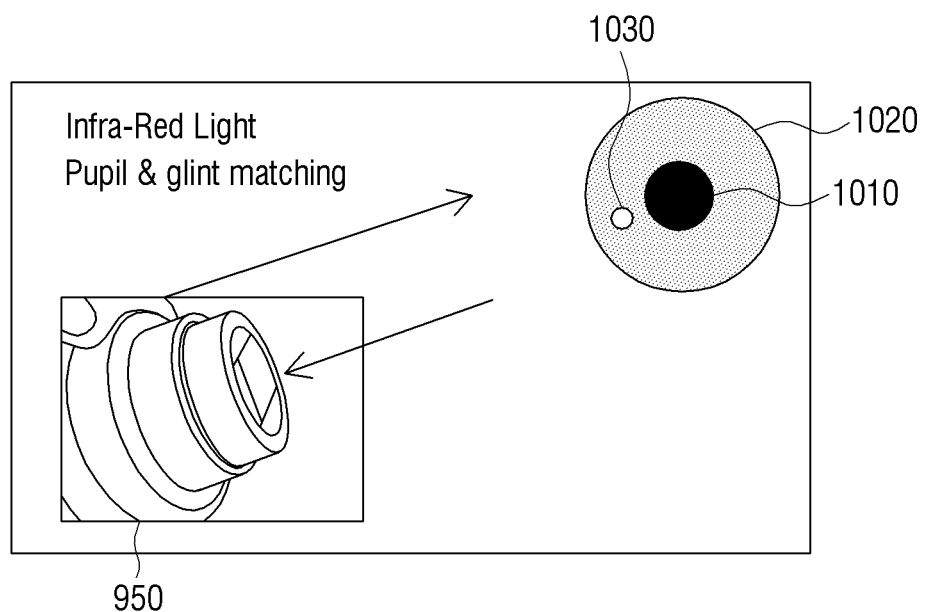
FIG. 10 is a view illustrating a method of detecting an eye direction by using infrared rays, according to an exemplary embodiment of the present general inventive concept.

FIG. 10 is a view illustrating a method of detecting an eye direction of a user by using infrared rays, according to an exemplary embodiment.

Referring to FIG. 10, the infrared output unit 940, i.e., infrared output, may output infrared rays in a user direction, display a glint area by the output infrared rays, and perform image capturing with respect to a user whose glint area is displayed, to generate a captured image.

The eye direction sensor 930 may detect a pupil 1010, an iris 1020, and a glint area 1030 generated by the infrared rays from the captured image.

In the present exemplary embodiment, the eye direction sensor 930 detects the pupil 1010, the iris 1020, and the glint area 1030 generated by the infrared rays from the captured image that is generated by performing the capturing with respect to the user through the imaging unit 950. However, even if the imager 950 does not perform the capturing, the eye direction sensor 930 may control the infrared output 940 and the imager 950 to detect the pupil 1010, the iris 1020, and the glint area 1030 generated by the infrared rays.

In other words, the eye direction sensor 930 may detect the pupil 1010, the iris 1020, and the glint area 1030 generated by the infrared rays in real time without generating the captured image of the user.

However, a captured image used in the detailed description of the present general inventive concept includes a still image that is acquired by performing only capturing and an image that is formed by all types of light incident through the imager 950.

Therefore, a real-time image, from which the pupil 1010, the iris 1020, and the glint area 1030 generated by the infrared rays will be detected by the eye direction sensor 930 in real time, is also included in the image that is formed by all types of light incident through the imager 950. For example, an image that is captured in a preview format is also included in the captured image of the present general inventive concept.

Figure 11:
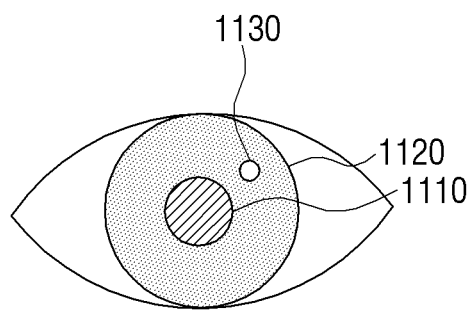
FIG. 11 is a detailed view illustrating a method of determining an eye direction of a user, according to another exemplary embodiment of the present general inventive concept.

FIG. 11 is a detailed view illustrating a method of determining an eye direction of a user, according to an exemplary embodiment of the present general inventive concept.

Referring to FIG. 11, a pupil 1110, an iris 1120, and a glint area 1130 are illustrated. The eye direction sensor 930 may sense an eye direction of a user based on a position relation between the pupil 1110, the iris 1120, and the glint area 1130. In detail, the position relation refers to a relation between a distance between a central point of the pupil 1110 and a central point of the glint area 1130 and a size of the iris 1120.

In particular, the eye direction sensor 930 may sense the eye direction of the user according to a value that is calculated by comparing the distance between the central points of the pupil 1110 and the glint area 1130 with the size of the iris 1120.

Here, the comparison between the distance between the central points of the pupil 1110 and the glint area 1130 and the size of the iris 1120 may be calculated by Equation 1 below:

$$K = \frac{d}{R} \quad (1)$$

Wherein d denotes the distance between the central points of the pupil 1110 and the glint area 1130, and R denotes the size of the iris 1120. Here, a length of a radius or a diameter of the iris 1120 may be used as the size of the iris 1120.

Therefore, the eye direction sensor 930 may sense the eye direction of the user according to a result value K that is acquired by dividing the distance between the central points of the pupil 1110 and the glint area 1130 by the length of the radius or diameter of the iris 1120.

The eye direction sensor 930 determines the eye direction of the user according to the result value K that is acquired by comparing the distance between the central points of the pupil 1110 and the glint area 1130 with the size of the iris 1120. Therefore, although a distance between the user and the display apparatus 900 is changed, the result value K may be constantly maintained as ratio information between the distance between the central points of the pupil 1110 and the glint area 1130 and the radius or diameter of the iris 1120. Therefore, although the distance between the user and the display apparatus 100 is changed by a motion of the user, a motion or a vibration of the display apparatus 900, or the like, the eye direction sensor 930 of the display apparatus 900 according to the exemplary embodiment may accurately check the eye direction of the user. In other words, an effect of a variable caused by a motion is reduced, and a robustness thereof is increased.

Here, the position relation may be set to different values according to positions toward which the eye of the user moves among a plurality of areas of a screen displayed on the display unit 910 of the display apparatus 900 and then stored in the storage 970.

For example, when the screen displayed on the display apparatus 500 is divided into the three areas 510, 520, and 530 as shown in FIG. 5, a value of a position relation between the pupil 1110, the iris 1120, and the glint area 1130 in the area 510 positioned in the uppermost part, a value of a position relation between the pupil 1110, the iris 1120, and the glint area 1130 in the area 520 positioned in the center, and a value of a position relation between the pupil 1110, the iris 1120, and the glint area 1130 in the area 530 positioned in the lowermost part may be set to be different from one another and then stored in the storage 970.

Figure 12A:
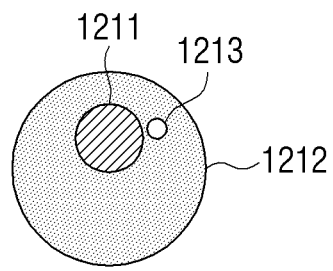
FIGS. 12A through 12C are detailed views illustrating a method of determining an eye direction based on a position relation between a pupil, an iris, and a glint area, according to another exemplary embodiment of the present general inventive concept.
Figure 12B:
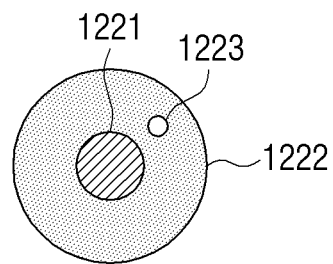
Figure 12C:
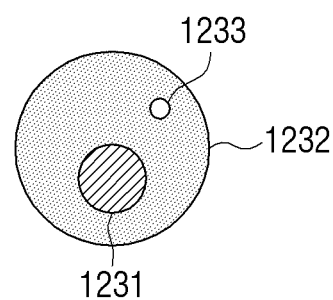

FIGS. 12A through 12C are detailed views illustrating a method of determining an eye direction of a user based on a position relation between a pupil, an iris, and a glint area, according to an exemplary embodiment.

Glint areas 1213, 1223, and 1233 are generated by infrared rays and may be marked in preset places. Since a user rarely looks at a screen of the display apparatus 900 at the front to move the display apparatus 900, the glint areas 1213, 1223, and 1233 generated by the infrared rays are mostly marked in the preset places.

Also, a value of a position relation between the pupil 1110, the iris 1120, and the glint area 1130 in the area 510 positioned in the uppermost part may be set to a section between 0 and 2/R. A value of a position relation between the pupil 1110, the iris 1120, and the glint area 1130 in the area 520 positioned in the center may be set to a section between 2/R and 4/R. A value of a position relation between the pupil 1110, the iris 1120, and the glint area 1130 in the area 530 positioned in the lowermost part may be set to a section between 4/R and 6/R.

Therefore, referring to FIG. 12A, if a distance between a central point of a pupil 1211 and a central point of the glint area 1213 is 1, a distance d between the central point of the pupil 1211 and the central point of the glint area 1213 is calculated as 1 according to Equation 1 above. If a radius or diameter of an iris 1212 is a constant R, a result value that is acquired by comparing the distance d and the constant R is 1/R.

Also, the eye direction sensor 930 may determine that the result value 1/R corresponds to the area 510 positioned in the uppermost part to sense that an eye direction of a user is in the area 510. Here, the area 510 is set to a section between 0 and 2/R among sections stored in the storage 970.

Referring to FIG. 12B, a distance between a central point of a pupil 1221 and a central point of the glint area 1223 relatively increases compared to the distance between the central points of the pupil 1211 and the glint area 1213 of FIG. 12A. If the distance between the central points of the pupil 1221 and the glint area 1223 is 3, the distance d between the central points of the pupil 1221 and the glint area 1223 is calculated as 3 according to Equation 1 above, and a radius or diameter of an iris 1222 is a constant R. In this case, a result value that is acquired by comparing the distance between the central points of the pupil 1221 and the glint area 1223 with the radius or diameter of the iris 1222 is 3/R.

Also, the eye direction sensor 930 may determine that the result value 3/R corresponds to the area 520 positioned in the center to sense that the eye direction of the user is in the area 520. Here, the area 520 is set to a section between 2/R and 4R among the sections stored in the storage 970.

Referring to FIG. 12C, a distance between a central point of a pupil 1231 and a central point of the glint area 1233 relatively increases compared to the distance between the central points of the pupil 1221 and the glint area 1223 of FIG. 12B. If the distance between the central points of the pupil 1231 and the glint area 1233 is 5, the distance d between the central points of the pupil 1231 and the glint area 1233 is calculated as 5 according to Equation 1 above, and a radius or diameter of an iris 1232 is a constant R. In this case, a result value that is acquired by comparing the distance d and the radius or diameter of the iris 1232 is 5/R.

Also, the eye direction sensor 930 may determine that the result value 5/R corresponds to the area 530 positioned in the lowermost part to sense that the eye direction of the user is in the area 530. Here, the area 530 is set to a section between 4/R and 6/R among the sections stored in the storage 970.

Figure 13:
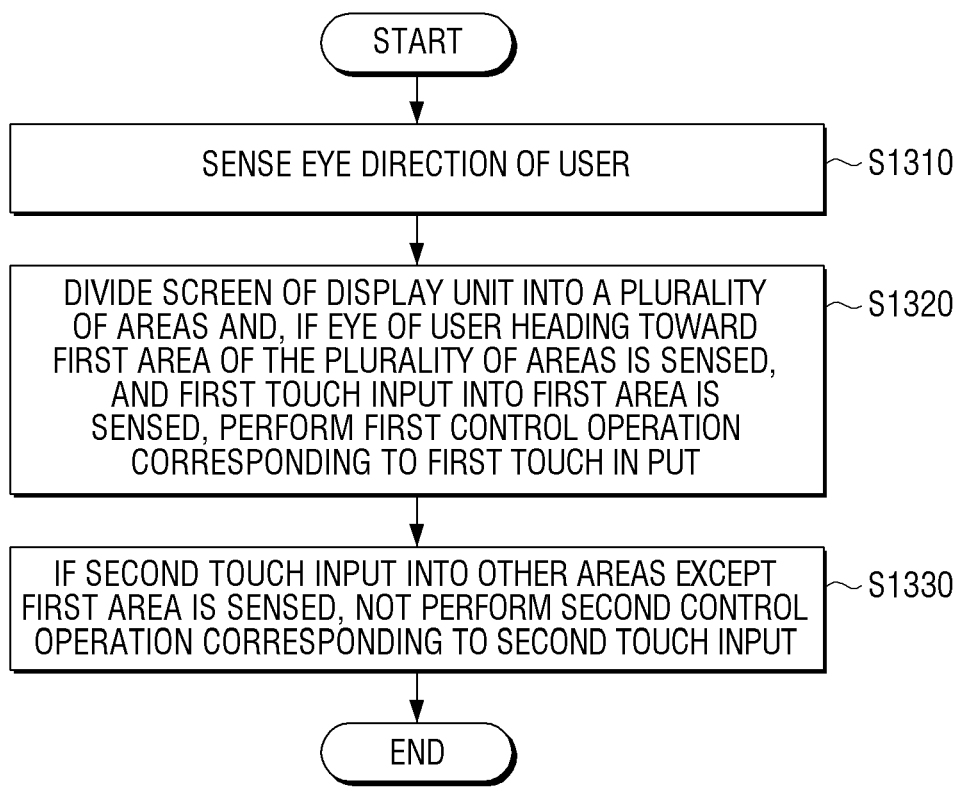
FIG. 13 is a flowchart of a method of controlling a display apparatus including a display unit and a sensor for sensing a touch input into the display unit, according to an exemplary embodiment of the present general inventive concept.

FIG. 13 is a flowchart of a method of controlling a display apparatus, according to an exemplary embodiment.

Referring to FIG. 13, in operation S1310, the display apparatus senses an eye direction of a user.

In operation S1320, the display apparatus divides a screen into a plurality of areas, senses an eye of the user moving toward the first area of the plurality of areas, and, if a first touch input into the first area is sensed, performs a first control operation corresponding to the first touch input.

If a second touch input into the other areas except the first area is sensed, the display apparatus does not perform a second control operation corresponding to the second touch input in operation S1330.

FIG. 14 is a flowchart of a method of displaying a display apparatus, according to another exemplary embodiment of the present general inventive concept.

Referring to FIG. 14, in operation S1410, the display apparatus senses an eye direction of a user.

In operation S1420, the display apparatus divides a screen into a plurality of areas, senses an eye of the user heading toward the first area of the plurality of areas, and, if a first touch input into the first area is sensed, performs a first control operation corresponding to the first touch input.

If a second touch input into the other areas except the first area is sensed, the display apparatus does not perform a second control operation corresponding to the second touch input in operation S1430.

If a preset type of user control is input into the other areas except the first area, the display apparatus executes a function corresponding to the user control in operation S1440.

Here, the user control may be a scroll control for scrolling a screen, and if the scroll control is input, a whole screen may be scrolled in a direction of the scroll control in operation S1440.

The user control may also be a keyboard input control for controlling a virtual keyboard displayed on the screen.

The method of FIG. 13 may further include: storing a plurality of user controls set to be input into the other areas, and corresponding function information respectively matching the user controls; and if one of the plurality of user controls is input into the other areas, performing a control operation according to function information matching the input user control.

The method of FIG. 13 may further include: performing image capturing with respect to the user to generate a captured image. In operation S1320 of sensing the eye direction of the user, the display apparatus may detect an image of an eye area of the user from the captured image and compare the detected image with eye images that respectively look at a plurality of areas and are stored in a storage unit, to sense the eye direction of the user.

The method of FIG. 13 may further include: outputting infrared rays in a user direction; and performing capturing with respect to the user to generate a captured image. In operation S1320 of sensing the eye direction of the user, the display apparatus may detect a pupil, an iris, and a glint area generated by the infrared rays from the captured image and sense the eye direction of the user based on a position relation between the pupil, the iris, and the glint area.

Here, the position relation may be set to different values according to positions of the plurality of areas toward which the eye of the user heads and then stored.

According to various exemplary embodiments as described above, whether a function will be executed may be set according to an area in which an eye of a user is sensed and an area in which the eye of the user is not sensed. Therefore, a malfunction of a display apparatus may be prevented.

There may be provided a non-transitory computer-readable medium that stores a program sequentially performing a controlling method according to the present general inventive concept.

For example, there may be provided a non-transitory computer-readable medium that stores a program performing operations: sensing an eye direction of a user; dividing a screen of a display into a plurality of areas and, if an eye of the user heading toward the first area of the plurality of areas is sensed, and a first touch input into the first area is sensed, performing a first control operation corresponding to the first touch input; if a second touch input into the area areas except the first area is sensed, not performing a second control operation corresponding to the second touch input; and if a preset type of user control is input into the other areas except the first area, executing a function corresponding to the user control.

The non-transitory computer readable medium refers to a medium which does not store data for a short time such as a register, a cache memory, a memory, or the like but semi-permanently stores data and is readable by a device. In detail, the above-described various applications or programs may be stored and provided on a non-transitory computer readable medium such as a CD, a DVD, a hard disk, a blue-ray disk, a universal serial bus (USB), a memory card, a ROM, or the like.

A bus is not shown in the above-described block diagrams illustrating a display apparatus. However, communications between elements of the display apparatus may be performed through the bus. Also, each device may further include a processor, such as a central processing unit (CPU), a microprocessor, or the like, performing the above-described various operations.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A display apparatus comprising:
   a display;
   a sensor configured to sense a touch input into the display;
   an eye direction sensor configured to sense an eye direction of a user; and
   a controller configured to:
      divide a screen of the display into a plurality of areas,
      identify if an eye of the user is sensed to be directed toward a first area of the plurality of areas,
      in response to identifying that the eye of the user is sensed to be directed toward the first area, perform a first control operation corresponding to a first touch input if the first touch input is sensed in the first area, and
      in response to the identifying that the eye of the user is sensed to be directed toward the first area, not perform a second control operation corresponding to a second touch input if the second touch input is sensed in another area from among the plurality of areas except the first area,
   wherein, in response to a preset type of user control being input, as a third touch input, into another area except the first area, the controller executes a function corresponding to the user control.

2. The display apparatus of claim 1, wherein the user control is a scroll control for scrolling a screen of the display, wherein in response to the scroll control being input, the controller scrolls the whole screen of the display in a direction of the scroll control.

3. The display apparatus of claim 1, wherein the user control is a keyboard input control for controlling a virtual keyboard displayed on the display.

4. The display apparatus of claim 1, further comprising:
   a storage configured to store a plurality of user controls set to be input into the other areas and corresponding function information respectively matching the user controls,
   wherein in response to one of the plurality of user controls being input into the other areas, the controller performs a control operation according to function information matching the input user control.

5. The display apparatus of claim 1, further comprising:
   an imager configured to perform image capturing with respect to a user to generate a captured image; and
   a storage configured to store a plurality of eye images respectively looking at the plurality of areas,
   wherein the eye direction sensor detects an image of an eye area of the user from the captured image and compares the detected image with an image stored in the storage to sense the eye direction of the user.

6. The display apparatus of claim 4, further comprising:
   an infrared output configured to output infrared rays in a direction of the user; and
   an imaging configured to perform image capturing with respect to the user to generate a captured image,
   wherein the eye direction sensor detects a pupil, an iris, and a glint area generated by the infrared rays from the captured image and senses the eye direction of the user based on a position relation between the pupil, the iris, and the glint area.

7. The display apparatus of claim 6, wherein the position relation is set to different values according to positions of the plurality of areas toward which the eye of the user moves and then stored in the storage.

8. A method of controlling a display apparatus, the method comprising:
   sensing an eye direction of a user;
   dividing a screen into a plurality of areas;
   identifying whether an eye of the user is sensed to be directed towards a first area of the plurality of areas;
   in response to identifying that the eye of the user is sensed to be directed toward the first area, performing a first control operation corresponding to a first touch input if the first touch input is sensed in the first area;
   performing a second control operation corresponding to a second touch input if the second touch input is sensed in another area from among the plurality of areas except the first area; and
   in response to a preset type of user control being input, as a third touch input, into the other areas, executing a function corresponding to the user control.

9. The method of claim 8, wherein the user control is a scroll control for scrolling the screen,
   wherein in response to the scroll control being input, the whole screen of a display is scrolled in a direction of the scroll control.

10. The method of claim 8, wherein the user control is a keyboard input control for controlling a virtual keyboard displayed on the screen.

11. The method of claim 8, further comprising:
   storing a plurality of user controls set to be input into another area and function information respectively matching the user controls; and in response to one of the plurality of user controls being input into another area, performing a control operation according to function information matching the input user control.

12. The method of claim 11, further comprising:
outputting infrared rays in a direction of the user; and
performing image capturing with respect to the user to generate a captured image,
wherein a pupil, an iris, and a glint area generated by the infrared rays are detected from the captured image, and the eye direction of the user is sensed based on a position relation between the pupil, the iris, and the glint area.

13. The method of claim 12, wherein the position relation is set to different values according to positions of the plurality of areas toward which the eye of the user moves and then stored.

14. The method of claim 8, further comprising:
performing image capturing with respect to the user to generate a captured image,
wherein an image of an eye area of the user is detected from the captured image and then compared with eye images that respectively look at the plurality of areas and are stored in a storage, in order to sense the eye direction of the user.

15. A display apparatus comprising:
a display;
a sensor configured to detect a touch input to the display;
an infrared output configured to output infrared light toward a user;
an imager configured to capture a plurality of images of an eye of the user;
a storage configured to store the plurality of eye images;
an eye direction sensor configured to produce a detected image of an eye area and detect a plurality of eye components from the plurality of captured images and identify an eye direction of the user by comparing the plurality of captured images of an eye of the user in the storage with the detected eye image;
a controller configured to divide a screen of the display into a plurality of sections, identify whether an eye of the user is directed toward a first section from among the plurality of sections, in response to identifying that the eye of the user is directed toward the first section execute a corresponding first control operation relating to a first touch input if the first touch input is detected in the first section, and in response to the identifying that the eye of the user is directed toward the first section, not execute a corresponding second control operation relating to a second touch input if the second touch input is detected in a second section from among the plurality of sections not including the first section;
wherein, in response to a preset user control input, as a third touch input, in a third section from among the plurality of sections not including the first section, the controller executes a function corresponding to the preset user control; and
wherein the eye direction sensor is configured to identify a ratio based on a position of a pupil, an iris, and a glint area of the eye.

16. A method of controlling a display apparatus, the method comprising:
outputting infrared light toward an eye of a user;
detecting the infrared light reflected from the eye of the user;
generating a plurality of captured images of the eye of the user using the infrared light reflected from the eye of the user;
identifying a pupil, an iris and a glint area of the user's eye from the plurality of captured images;
storing the plurality of eye images in a storage;
generating a ratio between a position of the pupil, the iris and the glint area of the user's eye;
identifying an eye direction to which the eye points based on the ratio;
dividing a screen into a plurality of sections;
identifying whether the eye of the user is pointing toward a first section from among the plurality of sections; and
in response to the identifying that the eye of the user is pointing toward the first section, executing a first control operation corresponding to a first touch input if the first touch input is detected in the first section and executing a second control operation corresponding to a second touch input if the second touch input is detected in a second section from among the plurality of sections excluding the first section, and executing a third control operation corresponding to a preset user input, which is a third touch input, if the preset user input is detected in a third section from among the plurality of sections excluding the first section.

17. The display apparatus of claim 1, wherein the controller is further configured to identify whether the sensed eye of the user is directed toward same area as the touch input which is one of the first touch input and the second touch input.

* * * * *